(12) United States Patent
Uji et al.

(10) Patent No.: US 10,207,703 B2
(45) Date of Patent: Feb. 19, 2019

(54) CONSTRUCTION MACHINE

(71) Applicant: Hitachi Construction Machinery Co., Ltd., Taito-ku, Tokyo (JP)

(72) Inventors: Katsumasa Uji, Tsukuba (JP); Yuichiro Morita, Hitachi (JP); Kouichi Shibata, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 13 days.

(21) Appl. No.: 15/508,132

(22) PCT Filed: Dec. 3, 2015

(86) PCT No.: PCT/JP2015/083990
§ 371 (c)(1),
(2) Date: Mar. 2, 2017

(87) PCT Pub. No.: WO2016/088827
PCT Pub. Date: Jun. 9, 2016

(65) Prior Publication Data
US 2017/0282907 A1 Oct. 5, 2017

(30) Foreign Application Priority Data
Dec. 3, 2014 (JP) .................................. 2014-244881

(51) Int. Cl.
*B60W 20/40* (2016.01)
*B60W 20/13* (2016.01)
(Continued)

(52) U.S. Cl.
CPC ............ *B60W 20/40* (2013.01); *B60W 20/13* (2016.01); *B60W 30/192* (2013.01); *F02D 29/04* (2013.01);
(Continued)

(58) Field of Classification Search
CPC .... B60W 20/40; B60W 20/13; B60W 30/192; F02N 11/0862; F02D 29/04; F02D 41/062; E02F 9/2091; E02F 9/2075
See application file for complete search history.

(56) References Cited

U.S. PATENT DOCUMENTS 7,570,021 B2 * 8/2009 Togashi et al. ....... B60W 20/13
320/130
2007/0138998 A1 6/2007 Togashi et al.

FOREIGN PATENT DOCUMENTS

JP 2001-41067 A 2/2001
JP 2002-359935 A 12/2002
(Continued)

OTHER PUBLICATIONS

Espacenet Translation of JP2012241339A, 18 pages (Year: 2012).*
(Continued)

*Primary Examiner* — Dale W Hilgendorf
(74) *Attorney, Agent, or Firm* — Crowell & Moring LLP

(57) ABSTRACT

At the time of starting up an engine (9) using an assist motor generator (10), a main controller (28) lowers a lower limit value in a charge/discharge range of an electricity storage device (19) from a first lower limit value (min1) to a second lower limit value (min2) through an energy management control part (28B). The main controller (28) heightens the lower limit value in the charge/discharge range of an electricity storage device (19) from the second lower limit value (min2) to the first lower limit value (min1) when the start of the engine (9) is completed. Further, the main controller (28) displays engine stop prohibition information on a display device (30) when the start of the engine (9) is completed and when an SOC of the electricity storage device (19) falls below the first lower limit value (min1).

3 Claims, 8 Drawing Sheets

(51) Int. Cl.
*B60W 30/192* (2012.01)
*F02D 29/04* (2006.01)
*F02D 41/06* (2006.01)
*F02N 11/08* (2006.01)
*E02F 9/20* (2006.01)
*B60K 6/485* (2007.10)
*B60L 11/14* (2006.01)
*B60W 10/06* (2006.01)
*B60W 10/08* (2006.01)
*B60W 10/26* (2006.01)
*B60W 20/00* (2016.01)
*F02D 29/00* (2006.01)
*F02D 29/02* (2006.01)
*F02D 29/06* (2006.01)
*B60W 50/14* (2012.01)
*B60W 50/00* (2006.01)

(52) U.S. Cl.
CPC ........ *F02D 41/062* (2013.01); *F02N 11/0862* (2013.01); *B60K 6/485* (2013.01); *B60L 11/14* (2013.01); *B60W 10/06* (2013.01); *B60W 10/08* (2013.01); *B60W 10/26* (2013.01); *B60W 20/00* (2013.01); *B60W 50/14* (2013.01); *B60W 2050/0094* (2013.01); *B60W 2300/17* (2013.01); *B60W 2510/244* (2013.01); *B60W 2510/30* (2013.01); *B60W 2540/04* (2013.01); *E02F 9/20* (2013.01); *E02F 9/2075* (2013.01); *E02F 9/2091* (2013.01); *F02D 29/00* (2013.01); *F02D 29/02* (2013.01); *F02D 29/06* (2013.01); *Y02T 10/6226* (2013.01); *Y02T 10/6286* (2013.01); *Y02T 10/7077* (2013.01); *Y10S 903/903* (2013.01)

(56) References Cited

FOREIGN PATENT DOCUMENTS

| | | | | |
|---|---|---|---|---|
| JP | 2002359935 A | * | 12/2002 | ............... E02F 9/20 |
| JP | 2004-166367 A | | 6/2004 | |
| JP | 3647319 B2 | | 5/2005 | |
| JP | 2005-151721 A | | 6/2005 | |
| JP | 2005-207303 A | | 8/2005 | |
| JP | 2007-162657 A | | 6/2007 | |
| JP | 2011-57073 A | | 3/2011 | |
| JP | 2012-66786 A | | 4/2012 | |
| JP | 2012241339 A | * | 10/2012 | ............... E02F 9/20 |
| JP | 2012-241339 A | | 12/2012 | |

OTHER PUBLICATIONS

Espacenet Translation of JP2002359935A, 23 pages (Year: 2002).*
International Search Report (PCT/ISA/210) issued in PCT Application No. PCT/JP2015/083990 dated Feb. 16, 2016 with English translation (Five (5) pages).
Japanese-language Written Opinion (PCT/ISA/237) issued in PCT Application No. PCT/JP2015/083990 dated Feb. 16, 2016 (Five (5) pages).
English translation of document C3 (Japanese-language Office Action issued in counterpart Japanese Application No. 2014-244881 dated Aug. 22, 2017) previously filed on Dec. 19, 2017 (five pages).
Japanese-language Office Action issued in counterpart Japanese Application No. 2014-244881 dated Aug. 22, 2017 (Four (4) pages).

* cited by examiner

CONSTRUCTION MACHINE

TECHNICAL FIELD

The present invention relates to a construction machine that can drive a hydraulic pump by use of an engine (internal combustion engine) and an electric motor.

BACKGROUND ART

In general, a construction machine as a hydraulic excavator is provided with an engine using a gasoline, a light oil or the like as fuel, a hydraulic pump driven by the engine, a hydraulic motor driven by pressurized oil delivered from the hydraulic pump, and a hydraulic actuator of a hydraulic cylinder or the like. The hydraulic actuator is small in size and light in weight, and is capable of producing large output, which is widely used as an actuator for the construction machine.

On the other hand, there is known a hybrid-type hydraulic excavator using both an engine and a motor generator together (refer to Patent Document 1). In this hybrid-type hydraulic excavator, for example, the motor generator and a hydraulic pump are attached on an output shaft of the engine and an electricity storage device is provided to be electrically connected to the motor generator. The motor generator has an electric generator function of charging the electricity storage device with power generated by a driving force of the engine and an electric motor function of assisting in the engine by power running using power of the electricity storage device.

There is known a hybrid-type hydraulic excavator that assists in a start of an engine based upon an electric motor function of a motor generator at an engine starting time by a discharge of an electricity storage device to improve start-up performance of the engine. Patent Document 2 describes a hybrid-type hydraulic excavator configured to assist in an engine start through a battery-drive of a motor generator in a case where an engine does not start, for example, due to a factor of a low temperature or the like regardless of the intent of starting the engine.

Further, Patent Document 3 describes a hybrid-type hydraulic excavator of performing a charge of an electricity storage device by causing an operation of an engine to continue at an engine stop command and in a case where a state of charge (SOC) as a charge rate of the electricity storage device falls below a lower limit value necessary for the next engine start. The hybrid-type hydraulic excavator holds the SOC at the engine stop time to a value necessary for the next engine start, thus making it possible to certainly perform the next engine start.

Further, Patent Document 4 describes the configuration that in a case where an engine is in a start-up condition, a limit to the discharging of an electricity storage device is suppressed by a discharge power limiting device to secure power necessary for the engine start and increase frequency in which the engine can start.

PRIOR ART DOCUMENT

Patent Document

Patent Document 1: Japanese Patent No. 3647319 B
Patent Document 2: Japanese Patent Laid-Open No. 2012-66786 A
Patent Document 3: Japanese Patent Laid-Open No. 2012-241339 A
Patent Document 4: Japanese Patent Laid-Open No. 2004-166367 A

SUMMARY OF THE INVENTION

Incidentally, an electricity storage device such as a battery or an electric double layer capacitor is required to, for the purpose of degradation prevention due to an over discharge or overcharge, an effective use of power stored in the electricity storage device and the like, perform monitoring or estimation of an SOC and control the charge/discharge of the electricity storage device based upon the result. For example, when various electric actuators are provided to be connected electrically to the electricity storage device, it is necessary that the electricity storage device can receive regeneration power from the electric actuators and the electricity storage device can supply power to the motor generator and the electric actuator in response to the requirement. Therefore, the charging rate of the electricity storage device is controlled to the vicinity of an intermediate point (for example, SOC: 50 to 60%) between a state of being fully charged (SOC: 100%) and a state of being not charged at all (SOC: 0%).

The electricity storage device possibly degrades in performance and becomes short in lifetime due to the over discharge or overcharge. Accordingly, in the electricity storage device, the SOC is controlled to be maintained to the vicinity of the intermediate point, and further, it is necessary to suppress the excessive charge/discharge by providing a predetermined upper limit value and lower limit value to a use range of the SOC (charge/discharge range) and performing charge/discharge control within the use range for preventing the SOC from being excessively high or low.

However, in the configuration described in Patent Document 2, in a case where the SOC of the electricity storage device is in the vicinity of the lower limit value in the use range, the motor generator cannot be driven, causing a problem of being not capable of assisting in the engine start.

On the other hand, in the configuration described in Patent Document 3, an engine cannot possibly stop in a case of the intent of stopping the engine, for example, there is a possibility that it is impossible to stop the engine immediately in an emergency. In addition thereto, since it is necessary to continue an operation of the engine for charging, there is a possibility that a consumption amount of fuel increases and an extra exhaust gas is discharged.

In the configuration described in Patent Document 4, in a case of driving an electric motor without a sufficient charge of an electricity storage device, such as stopping an engine immediately after the engine start, even if a discharge power limitation is suppressed to broaden a use range of the electricity storage device, there is a problem that the engine cannot start due to a shortage of a remaining amount in the electricity storage device.

The present invention is made in view of the above-mentioned problems in the conventional technology, and an object of the present invention is to provide a construction machine that performs an engine start of this time in consideration of power necessary for the next engine start.

(1) For solving the above-mentioned problems, the present invention is applied to a construction machine comprising: an engine; an electric motor connected mechanically to the engine; a hydraulic pump connected mechanically to the engine; an electricity storage device connected electrically to the electric motor; a power remaining amount detecting unit that detects a power remaining amount in the electricity storage device; and a charge/discharge range setting unit that defines a range of the power remaining amount in which a charge/discharge of the electricity storage device is made possible as a charge/discharge range.

The configuration adopted by the present invention is characterized in that there is further comprising: an engine start control device that lowers a lower limit value of the charge/discharge range defined by the charge/discharge range setting unit when the engine starts up using the electric motor, wherein the engine start control device outputs engine stop prohibition information when the engine starts up and when it is determined that the power remaining amount detected by the power remaining amount detecting unit is insufficient to a power remaining amount necessary for the next engine start.

With this arrangement, the engine start control device lowers the lower limit value in the charge/discharge range of the electricity storage device when the engine starts. Therefore, for example, even when a charge amount of the electricity storage device is in the vicinity of the lower limit value when the engine starts, the power can be supplied to the electric motor from the electricity storage device and it is possible to start the engine using the electric motor. Therefore, it is possible to enhance start performance as compared to a construction machine of not lowering the lower limit value in the charge/discharge range of the electricity storage device at the engine starting time.

An information output unit of the engine start control device outputs engine stop prohibition information when the engine starts and when it is determined that the power remaining amount in the electricity storage device is insufficient to the power remaining amount necessary for the next engine start. At this time, since an operator can recognize that the power remaining amount in the electricity storage device is insufficient to the power remaining amount necessary for the next engine start by the engine stop prohibition information, an inadvertent stop of the engine by the operator is suppressed, making it possible to prompt the charge of the electricity storage device and secure the power necessary for the next engine start of the electricity storage device. Further, since the power remaining amount necessary for the next engine start is secured at the time of starting the engine, there is no necessity of charging the electricity storage device at the time of stopping the engine. Therefore, in a case where the engine stop is necessary, it is possible to stop the engine immediately.

(2) According to the present invention, the information output unit outputs the engine stop prohibition information when the engine starts up and when the power remaining amount detected by the power remaining amount detecting unit falls below the lower limit value in the charge/discharge range of the electricity storage device.

With this arrangement, the information output unit outputs the engine stop prohibition information when the engine starts and when the power remaining amount in the electricity storage device falls below the lower limit value in the charge/discharge range. At this time, since an operator can recognize that the power remaining amount in the electricity storage device falls below the lower limit value in the charge/discharge range, it is possible to suppress an inadvertent stop of the engine by the operator and secure the power greater than the lower limit value in the charge/discharge range as power necessary for the next engine start in the electricity storage device.

(3) According to the present invention, the information output unit outputs the engine stop prohibition information when the engine starts up and when the power remaining amount detected by the power remaining amount detecting unit falls below a threshold value set to be lower than the lower limit value in the charge/discharge range of the electricity storage device.

With this arrangement, the information output unit outputs the engine stop prohibition information when the engine starts and when the power remaining amount in the electricity storage device falls below the threshold value set to be lower than the lower limit value in the charge/discharge range. At this time, since an operator can recognize that the power remaining amount in the electricity storage device falls below the threshold value by the engine stop prohibition information, it is possible to suppress an inadvertent stop of the engine by the operator and secure power greater than the threshold value as the power necessary for the next engine start.

In addition, even when the power remaining amount in the electricity storage device is lower than the lower limit value in the charge/discharge range, in a case where the power remaining amount does not fall below the threshold value lower than the lower limit value and a shortage amount in the power remaining amount is sufficiently small, it is possible to supplement the shortage amount in the power remaining amount in a short time such as approximately several seconds. At this time, since the information output unit does not output the engine stop prohibition information, it is possible to suppress a notice of the engine stop prohibition information to an operator to the minimum.

(4) According to the present invention, the construction machine further comprising: a hydraulic actuator to be driven by pressurized oil delivered from the hydraulic pump; and a lock device for switching effectiveness and ineffectiveness of a drive command to the hydraulic actuator, wherein the information output unit does not output the engine stop prohibition information when the drive command is effective.

With this arrangement, the information output unit does not output the engine stop prohibition information when the drive command to the hydraulic actuator is effective by the lock device. Here, since the time when the drive command to the hydraulic actuator is effective by the lock device corresponds to the time when an operator drives the hydraulic actuator, the charge of the electricity storage device is supposed to keep up without immediately stopping the engine. Therefore, when the drive command to the hydraulic actuator is effective by the lock device, even when the power remaining amount in the electricity storage device is insufficient to the power remaining amount necessary for the next engine start, the information output unit does not output the engine stop prohibition information. As a result, it is possible to suppress a notice of the engine stop prohibition information to an operator to the minimum.

(5) According to the present invention, the construction machine further comprising: an operating device that outputs the drive command to the hydraulic actuator, wherein the information output unit does not output the engine stop prohibition information when the operating device is in operation.

With this arrangement, the information output unit does not output the engine stop prohibition information when the operating device is in operation. Here, when the operating device is in operation, since the hydraulic actuator is during driving by the operator, the charge of the electricity storage device is supposed to keep up without immediately stopping the engine. Therefore, when the operating device is in operation, even when the power remaining amount in the electricity storage device is insufficient to the power remaining amount necessary for the next engine start, the information output unit does not output the engine stop prohibition information. As a result, it is possible to suppress a notice of the engine stop prohibition information to an operator to the minimum.

MODE FOR CARRYING OUT THE INVENTION

Hereinafter, construction machines according to embodiments in the present invention will be in detail explained with reference to the accompanying drawings, with an example of application of each to a hybrid-type hydraulic excavator.

Figure 1:
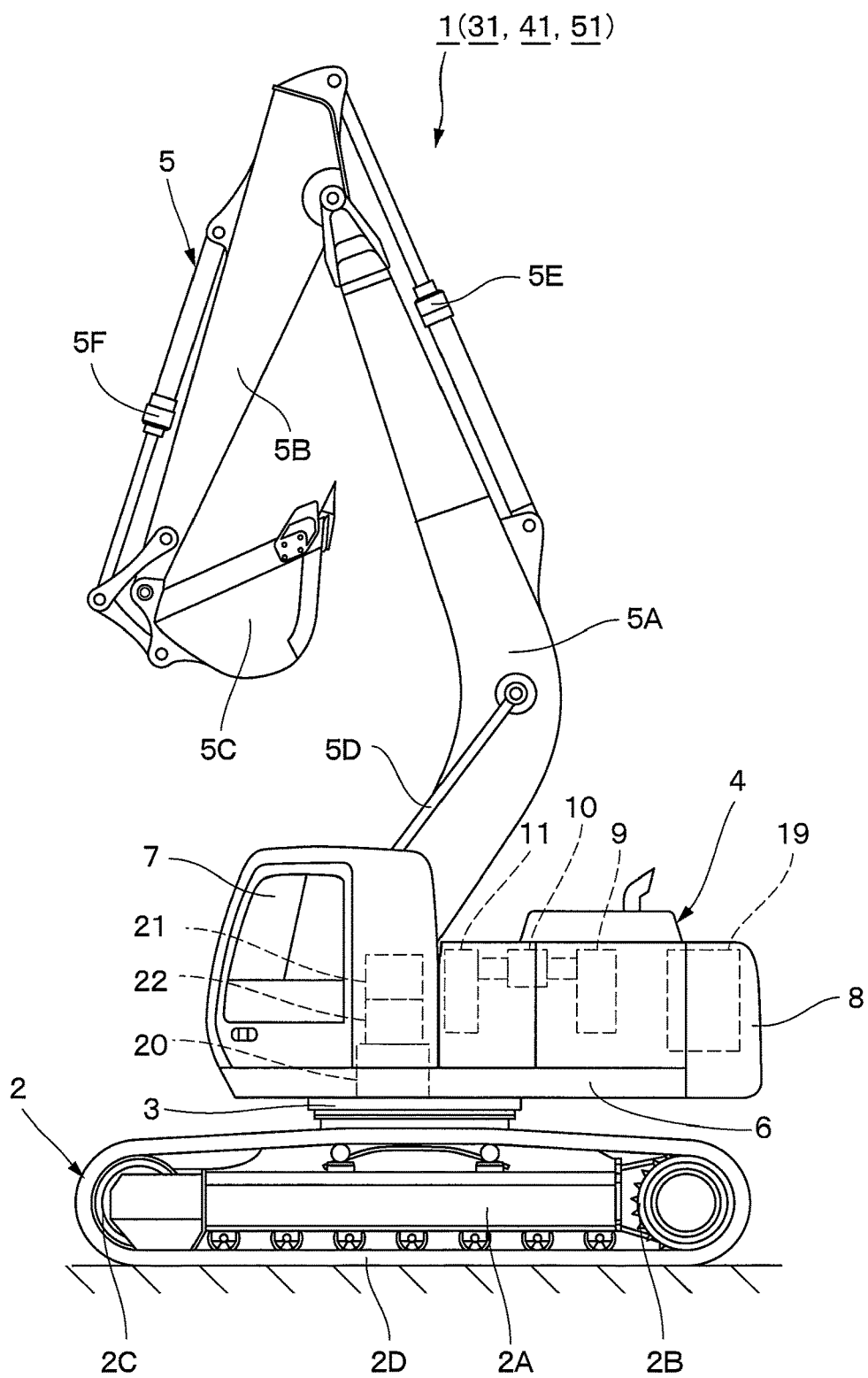
FIG. 1 is a front view showing a hydraulic excavator used in a first embodiment to a fourth embodiment of the present invention.

FIG. 1 to FIG. 4 show a first embodiment of the present invention. In FIG. 1, reference numeral 1 denotes a hybrid-type hydraulic excavator as a representative example of hybrid-type construction machines. The hybrid-type hydraulic excavator 1 (hereinafter, referred to as "hydraulic excavator 1") includes an automotive lower traveling structure 2 of a crawler type, a revolving bearing device 3 that is provided on the lower traveling structure 2, an upper revolving structure 4 that is mounted to be capable of revolving on the lower traveling structure 2 through the revolving bearing device 3 and configures a vehicle body (base body) together with the lower traveling structure 2, and a working mechanism 5 that is provided in the front side of the upper revolving structure 4 to be capable of lifting and tilting thereto and performs an excavating operation of earth and sand and the like.

The lower traveling structure 2 includes a track frame 2A, drive wheels 2B provided on both sides of the track frame 2A in the left-right sides, idler wheels 2C provided on both sides of the track frame 2A in the left-right sides at the other side in the front-rear direction to the drive wheels 2B, and crawler belts 2D wound around and between the drive wheels 2B and the idler wheels 2C (only the left one in any components is shown). The left and right drive wheels 2B are respectively driven and rotated by left and right traveling hydraulic motors 2E, 2F (refer to FIG. 2) as hydraulic actuators. On the other hand, the revolving bearing device 3 is attached on the upper side of a central part of the track frame 2A.

The working mechanism 5 includes a boom 5A mounted on a front side of a revolving frame 6 to be described later to be capable of lifting and tiling thereto, an arm 5B mounted on a tip end portion of the boom 5A to be capable of lifting and tiling thereto, a bucket 5C rotatably mounted on a tip end portion of the arm 5B, and a boom cylinder 5D, an arm cylinder 5E and a bucket cylinder 5F, which are respectively composed of hydraulic cylinders (hydraulic actuators) for driving them.

The upper revolving structure 4 includes the revolving frame 6 formed as a support structure. The revolving frame 6 is mounted to be capable of revolving on the lower traveling structure 2 through the revolving bearing device 3. Therefore, the revolving bearing device 3 is attached on a lower surface side of the revolving frame 6. On the other hand, the revolving frame 6 is provided thereon with a cab 7, a counterweight 8, an engine 9, an assist motor generator 10, a hydraulic pump 11, an electricity storage device 19, a revolving device 20, a power conversion device 23, and the like, which will be described later.

The cab 7 is provided on a left front side of the revolving frame 6, and an operator's seat (not shown) on which an operator sits is provided in the cab 7. An operating device 14, a key switch 29, a display device 30 and the like, which will be described later, are arranged on the periphery of the operator's seat.

The counterweight 8 is provided in a rear end side of the revolving frame 6 to act as a weight balance to the working mechanism 5.

The engine 9 is positioned between the cab 7 and the counterweight 8 and is disposed on the revolving frame 6. The engine 9 is configured using, for example, a diesel engine, and is mounted on the upper revolving structure 4 in a horizontal state extending in the left-right direction as an internal combustion engine of the hybrid-type hydraulic excavator 1. The assist motor generator 10 and the hydraulic pump 11, which will be described later, are connected mechanically to the output side of the engine 9.

Here, an operation of the engine 9 is controlled by an engine control unit 9A (hereinafter, referred to as "ECU 9A"), and, for example, a supply amount of fuel is variably controlled by a fuel injection device (not shown). That is, the ECU 9A variably controls an injection amount of fuel (fuel injection amount) to be injected into cylinders (not shown) of the engine 9 based upon a control signal outputted from a main controller 28 to be described later. Thereby, the engine 9 operates in a rotational speed corresponding to a drive operation by an operator, an operating state of a vehicle and the like. In addition, the ECU 9A stops fuel injection of the fuel injection device in response to a command of the main controller 28 when a stop operation of the key switch 29 to be described later is performed, and stops the engine 9.

The assist motor generator 10 is connected mechanically between the engine 9 and the hydraulic pump 11, and is provided as a motor generator. The assist motor generator 10 is configured of, for example, a permanent magnet type synchronous electric motor, and is driven/rotated by the engine 9 to generate power or assists in a drive of the engine 9 by supply of power. That is, the assist motor generator 10 has a function (an electric generator function) that is driven/ rotated by the engine 9 to generate power and a function (an electric motor function) that assists in a drive of the engine 9 as an electric motor by supply of power through the power conversion device 23 to be described later.

Generator power of the assist motor generator 10 is supplied to a chopper 26 through a first inverter 24 to be described later, and is charged (stored) in the electricity storage device 19. The generator power of the assist motor generator 10 is supplied to a second inverter 25 through the first inverter 24, and is used for a drive of a revolving electric motor 22. On the other hand, at the time of assisting in a drive of the engine 9, the assist motor generator 10 is driven by power charged in the electricity storage device 19 (or regeneration power of the revolving electric motor 22).

The hydraulic pump 11 is positioned between the assist motor generator 10 and a pilot pump 12, and is connected mechanically to the engine 9 through the assist motor generator 10. The hydraulic pump 11 configures a hydraulic source together with the pilot pump 12 and a hydraulic oil tank 13. The hydraulic pump 11 is configured of various types of hydraulic pumps such as a swash plate type, a bent axis type or a radial piston type, and is driven by the engine 9 and the assist motor generator 10. The hydraulic pump 11 increases a pressure of the hydraulic oil in the hydraulic oil tank 13 as a power source for driving traveling hydraulic motors 2E, 2F, cylinders 5D to 5F, a revolving hydraulic motor 21 to be described later and the like, which is delivered to a control valve 16 to be described later.

The pilot pump 12 is provided to be connected to the hydraulic pump 11. The pilot pump 12 delivers pressurized oil for pilot (pilot pressure) supplied to the control valve 16 as a hydraulic signal at the time of operating the operating device 14 to be described later.

The operating device 14 is positioned in the cab 7 and is connected to a pilot valve 15. The operating device 14 is configured by a traveling operating lever/pedal, a working operating lever and the like (any thereof is not shown). By operating the pilot valve 15 using the operating device 14, a flow amount and a direction of pressurized oil delivered from the pilot pump 12 are controlled to supply a pilot pressure to the control valve 16. Therefore, the control valve 16 switches a direction of the pressurized oil to the hydraulic motors 2E, 2F, 21 and the cylinders 5D to 5F for control. That is, the operating device 14 outputs the pilot pressure to the control valve 16 as a drive command to the hydraulic motors 2E, 2F, 21 and the cylinders 5D to 5F.

The control valve 16 is provided on the revolving frame 6, and includes a plurality of directional control valves that control the hydraulic motors 2E, 2F, 21 and the cylinders 5D to 5F. The control valve 16 switches supply and discharge of the pressurized oil delivered from the hydraulic pump 11 in response to a drive command (pilot pressure) based upon an operation of the pilot valve 15 (control a delivery amount and a delivery direction of the pressurized oil). Thereby, the pressurized oil delivered to the control valve 16 from the hydraulic pump 11 is distributed to the hydraulic motors 2E, 2F, 21 and the cylinders 5D to 5F respectively as needed to drive (rotate, expand and contract) the hydraulic motors 2E, 2F, 21 and the cylinders 5D to 5F.

A gate lock lever 17 configures a lock device, is positioned in the cab 7, and is connected to a pilot cut valve 18. The gate lock lever 17 blocks off a pilot pressure added to the pilot valve 15 to switch effectiveness and ineffectiveness of a drive command to the hydraulic motors 2E, 2F, 21 and the cylinders 5D to 5F by the operating device 14.

When the gate lock lever 17 is moved to a lock position (raised position), the pilot cut valve 18 blocks off the pressurized oil from the pilot pump 12 to the pilot valve 15 to cause the hydraulic motors 2E, 2F, 21 and the cylinders 5D to 5F to be incapable of operating through the operating device 14. On the other hand, when the gate lock lever 17 is moved to a lock releasing position (lowered position), the pilot cut valve 18 causes the pressurized oil from the pilot pump 12 to be communicated to enable the hydraulic motors 2E, 2F, 21 and the cylinders 5D to 5F to operate through the operating device 14.

In addition, when the gate lock lever 17 is in the lock releasing position, a starter cut relay (not shown) operates and power supply to the assist motor generator 10 acting as a starter is blocked off to prevent the engine 9 from starting up. It should be noted that the lock device is not limited to the gate lock lever 17 of a lever type rotating in an upper-lower direction, but may be configured of a component such various types of switches or pedals.

The electricity storage device 19 is disposed on the revolving frame 6, and is connected electrically to the assist motor generator 10 and the revolving electric motor 22 through the chopper 26, the first inverter 24 and the second inverter 25, which will be described later. The electricity storage device 19 stores power, and is configured using, for example, a secondary cell such as a lithium ion battery or a nickel hydrogen battery, or a capacitor of an electric double layer. That is, the electricity storage device 19 is charged (stored) by generator power generated by the assist motor generator 10 and generator power (regeneration power) generated by the revolving electric motor 22 at a revolving deceleration time, or discharges (supplies) the charged power to the assist motor generator 10 and the revolving electric motor 22.

Here, the electricity storage device 19 is provided with a battery control unit 19A (hereinafter, referred to as "BCU 19A"), which controls a charging operation and a discharging operation. The BCU 19A configures a power remaining amount detecting unit, and detects a state of charge (SOC) as a power remaining amount in the electricity storage device 19 to be outputted to the main controller 28 to be described later.

The revolving device 20 is provided on the upper revolving structure 4 (revolving frame 6), and includes a reduction gear (not shown), the revolving hydraulic motor 21, the revolving electric motor 22 and the like. The revolving device 20 revolves the upper revolving structure 4 to the lower traveling structure 2 by transmitting a rotational force to the revolving bearing device 3. Here, the revolving device 20 is configured as a so-called hybrid-type revolving device that drives/revolves the upper revolving structure 4 in cooperation with the revolving hydraulic motor 21 and the revolving electric motor 22.

The revolving electric motor 22 is attached on the upper side of the reduction gear together with the revolving hydraulic motor 21. The revolving electric motor 22 is configured, for example, using a permanent magnet type synchronous electric motor, and is driven by generator power by the assist motor generator 10 and power of the electricity storage device 19. Further, the revolving electric motor 22 converts energy generated at deceleration of a revolving operation into electrical energy to generate power.

That is, the revolving electric motor 22 has a function (revolving assist function) of revolving the upper revolving structure 4 by assisting in the revolving hydraulic motor 21 by supply of power through the power conversion device 23 to be described later, and a function (revolving regeneration function) of converting kinetic energy (rotational energy) of the upper revolving structure 4 into electrical energy at the revolving deceleration time (regeneration electric generation). The generator power (regeneration power) generated by the revolving electric motor 22 is supplied to the first inverter 24 and the chopper 26 to be described later via the second inverter 25 and DC buses 27A, 27B to be described later to perform a drive of the assist motor generator 10 and a charge (store) of the electricity storage device 19.

Next, an explanation will be made of an electric system of the hybrid-type hydraulic excavator 1.

Figure 2:
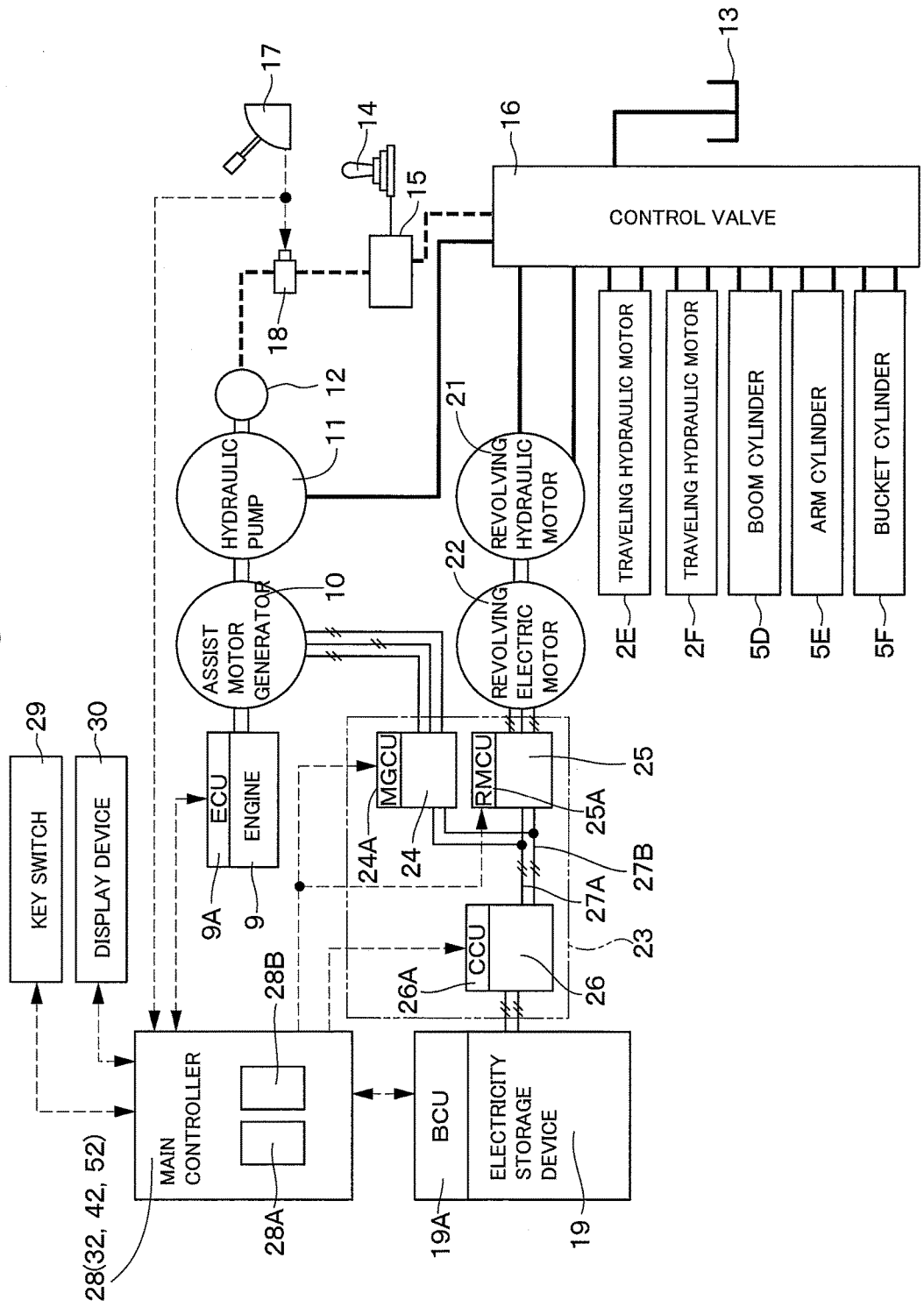
FIG. 2 is a block diagram showing the configuration of an electric system and a hydraulic system in the hydraulic excavator.

As shown in FIG. 2, the electric system of the hydraulic excavator 1 includes the assist motor generator 10, the electricity storage device 19 and the revolving electric motor 22 as mentioned above, and further, the first inverter 24, a motor generator control unit 24A (hereinafter, referred to as "MGCU 24A"), the second inverter 25, a revolving electric motor control unit 25A (hereinafter, referred to as "RMCU 25A"), the chopper 26, which will be described later, and the like. In this case, for example, the first inverter 24 and MGCU 24A, the second inverter 25 and RMCU 25A, and the chopper 26 configure the power conversion device (PCU: power control unit) 23, and the power conversion device 23 is mounted on the upper revolving structure 4.

The first inverter 24 is connected electrically to the assist motor generator 10 to control a drive of the assist motor generator 10. Specifically, the first inverter 24 is configured using a plurality of switching elements (for example, six elements) such as a transistor, an insulating gate bipolar transistor (IGBT), and is connected to a pair of the DC buses 27A, 27B. An opening/closing operation of the switching element of the first inverter 24 is controlled by a PWM signal of three phases (U phase, V phase, W phase) outputted from the MGCU 24A. At the power generation of the assist motor generator 10, the first inverter 24 converts generator power generated by the assist motor generator 10 into DC power, which is supplied to the DC buses 27A, 27B. On the other hand, at the motor drive time of the assist motor generator 10, the first inverter 24 generates AC power of three phases from the DC power of the DC buses 27A, 27B, which is supplied to the assist motor generator 10.

The second inverter 25 is connected electrically to the revolving electric motor 22 to control a drive of the revolving electric motor 22. Specifically, the second inverter 25 is, as substantially similar to the first inverter 24, configured using a plurality of switching elements (for example, six elements), and is connected to a pair of the DC buses 27A, 27B. An opening/closing operation of the switching element of the second inverter 25 is controlled by a PWM signal of three phases outputted from the RMCU 25A. At the revolving drive time of the revolving electric motor 22, the second inverter 25 generates AC power of three phases from the DC power of the DC buses 27A, 27B, which is supplied to the revolving electric motor 22. On the other hand, at the revolving deceleration time (at the regeneration time) of the revolving electric motor 22, the second inverter 25 converts regeneration power generated by the revolving electric motor 22 into DC power, which is supplied to the DC buses 27A, 27B.

The chopper 26 has one end that is connected to the electricity storage device 19 and the other end that is connected to the DC buses 27A, 27B. The chopper 26 and the first and second inverters 24, 25 are electrically connected with each other through a pair of the DC buses 27A, 27B. The chopper 26 is provided with a plurality (for example, 2 elements) of switching elements such as IGBT, and a reactor. An opening/closing operation of the switching element in the chopper 26 is controlled by a chopper control unit 26A (hereinafter, referred to as "CCU 26A").

At the charging time of the electricity storage device 19, the chopper 26 acts as a voltage dropping circuit (voltage dropping chopper), and, for example, drops a DC voltage supplied from the DC buses 27A, 27B, which is supplied to the electricity storage device 19. On the other hand, at the discharging time of the electricity storage device 19, the chopper 26 acts as a booster circuit (booster chopper), and boosts a DC voltage supplied from the electricity storage device 19, which is supplied to the DC buses 27A, 27B, for example.

The first and second inverters 24, 25 and the chopper 26 are connected at a plus side and at a minus side to each other through a pair of the DC buses 27A, 27B. A smoothing capacitor (not shown) is connected to the DC buses 27A, 27B for stabilizing a voltage of the DC buses 27A, 27B. For example, a predetermined DC voltage of approximately several hundred V is applied to the DC buses 27A, 27B.

The main controller 28 is provided in the cab 7, for example, and is connected to the ECU 9A, the BCU 19A, the MGCU 24A, the RMCU 25A, the CCU 26A and the like. The main controller 28 is configured of, for example, a microcomputer and the like, and is provided with a malfunction monitoring/malfunction processing control part 28A, an energy management control part 28B and the like. The main controller 28 generates control commands to the ECU 9A, the BCU 19A, the MGCU 24A, the RMCU 25A, the CCU 26A, and the like to perform drive controls of the assist motor generator 10 and the revolving electric motor 22, controls of the malfunction monitoring and the energy management of the electric system, and the like.

Figure 3:
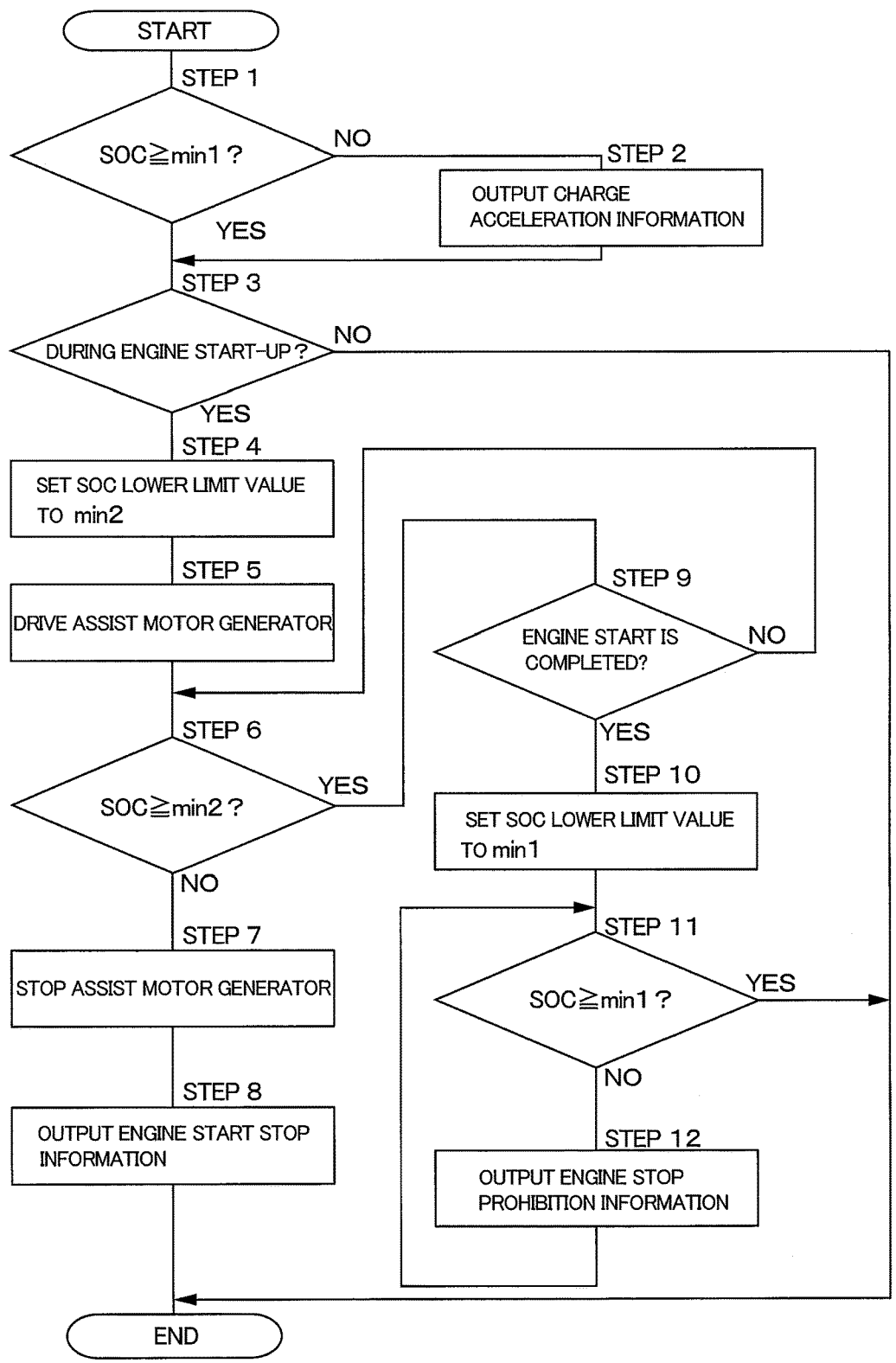
FIG. 3 is a flow chart showing an engine start control processing by a main controller in FIG. 2.

In addition, the main controller 28 is provided with a memory part (not shown) that stores programs of engine start control processing and the like as shown in FIG. 3. Thereby, at the time of starting up the engine 9, the main controller 28 controls the BCU 19A, the MGCU 24A, the CCU 26A and the like, and configures an engine start control device that starts up the engine 9 by the assist motor generator 10.

The malfunction monitoring/malfunction processing control part 28A determines whether or not a malfunction state such as failures, abnormality or warnings occurs in the electric system of the assist motor generator 10, the electricity storage device 19, the revolving electric motor 22, the power conversion device 23 or the like. In a case where it is determined that the malfunction has occurred, the malfunction monitoring/malfunction processing control part 28A outputs an electric system malfunction signal (signal for a notice of the malfunction) as a signal of the malfunction notice to the MGCU 24A and the like.

The energy management control part 28B performs control of holding the SOC of the electricity storage device 19 increasing/decreasing by a difference between energy consumed at acceleration and energy regenerated at deceleration by the revolving electric motor 22 within a predetermined charge/discharge range (for example, in a range where the SOC is approximately 30% to 70%) by outputting an electric generation command or an assist command to the assist motor generator 10. That is, the energy management control part 28B configures a charge/discharge range setting unit that defines a use range of the SOC chargeable/dischargeable in the electricity storage device 19 as a charge/discharge range.

In this case, the energy management control part 28B sets a predetermined upper limit value and a predetermined lower limit value to the charge/discharge range of the electricity storage device 19 for preventing the SOC from excessively increasing or decreasing in the electricity storage device 19. The energy management control part 28B performs the charge/discharge control of the electricity storage device 19 within a range between the upper limit value and the lower limit value to suppress the excessive charge/discharge of the electricity storage device 19.

At this time, the lower limit value (SOC lower limit value) of the charge/discharge range has a first lower limit value min1 (for example, min1=SOC: 30%) as a lower limit value in a typical charge/discharge range, and a second lower limit value min2 (for example, min2=SOC: 20%) in a charge/discharge range that is lowered for starting up the engine 9 by the assist motor generator 10 at the engine starting time.

Here, the first lower limit value min1 is a value having a predetermined margin to a limit value immediately leading to a degradation or a reduction in lifetime of the electricity storage device 19. In addition, the second lower limit value min2 is a value (low value) smaller than the first lower limit value min1 by a power amount by which the engine 9 can start by the assist motor generator 10 at least once even when the SOC is in the vicinity of the first lower limit value min1, and is a value (high value) larger than the limit value immediately leading to a degradation or a reduction in lifetime of the electricity storage device 19.

In this case, even when the second lower limit value in the charge/discharge range is lowered to the min2 in a short time necessary for the engine start, the time necessary for the start of the engine 9 is relatively short. Therefore, even when the second lower limit value is lowered to the min2 at the engine start, a possibility that a degradation or a reduction in lifetime of the electricity storage device 19 immediately occurs due thereto is low.

The key switch 29 is provided near the operator's seat in the cab 7. The key switch 29 is connected to the main controller 28, and configures a switch for switching a start and a stop of the engine 9. When the key switch 29 is operated to, for example, a start position, the main controller 28 outputs a control command for engine start to the ECU 9A, the MGCU 24A, the CCU 26A, the BCU 19A and the like to start the engine 9 using the assist motor generator 10 as a starter. When the key switch 29 is operated to a stop, the main controller 28 outputs a stop signal to the ECU 9A and the like to stop the engine 9.

The display device 30 is provided in front of the operator's seat in the cab 7, and is connected to the main controller 28. The display device 30 is configured of, for example, a crystal monitor, and displays various pieces of information in regard to a vehicle body such as a remaining amount of fuel, a water temperature of engine cooling water, a working time, and an in-compartment temperature and the like. In addition thereto, the display device 30 displays charge acceleration information, engine start stop information, and engine stop prohibition information during or after the start-up of the engine 9.

The hydraulic excavator 1 according to the first embodiment has the configuration as described above, and next, an explanation will be made of an operation thereof.

First, an operator gets in the cab 7 and is seated on the operator's seat, and rotates the key switch 29 to the start position in a state of fixing the gate lock lever 17 to the lock position. Thereby, the assist motor generator 10 is driven/rotated and fuel is supplied to the engine 9, starting up the engine 9. When an engine speed is more than a predetermined rotational speed (for example, idle rotational speed) and the engine 9 becomes in an engine start completion state, the operator switches the gate lock lever 17 from the lock position to the lock releasing position.

In this state, when the operator operates the traveling operating lever/pedal of the operating device 14, the pressurized oil delivered through the control valve 16 from the hydraulic pump 11 is supplied to the traveling hydraulic motors 2E, 2F of the lower traveling structure 2, the hydraulic excavator 1 performs a traveling operation of a forward travel, a backward travel or the like. In addition, when the operator operates the working operating lever of the operating device 14, the pressurized oil delivered through the control valve 16 from the hydraulic pump 11 is supplied to the revolving hydraulic motor 21 and the cylinders 5D to 5F, the hydraulic excavator 1 performs a revolving operation, an excavating operation by a lifting/tilting movement of the working mechanism 5, or the like.

Figure 4:
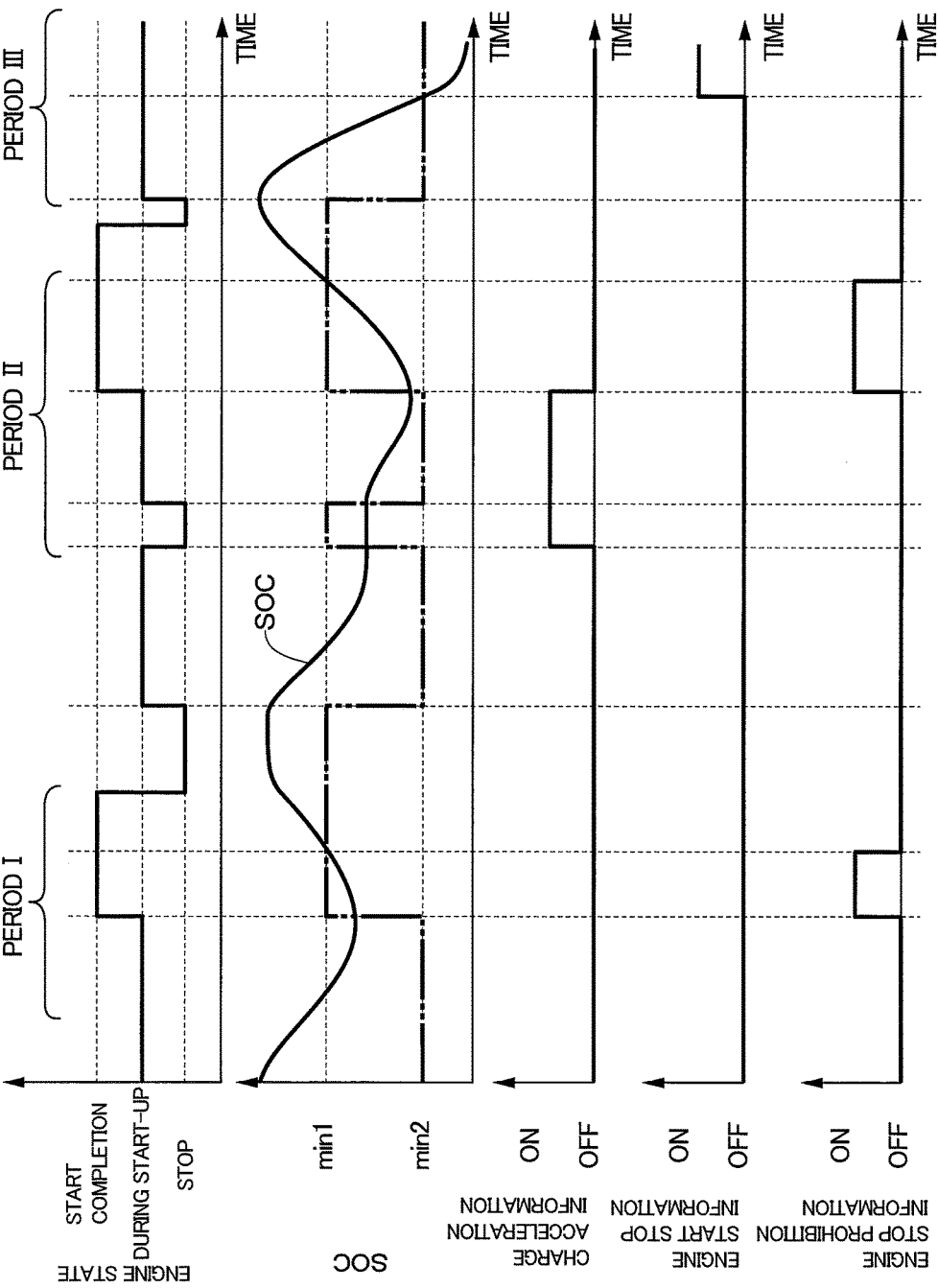
FIG. 4 is a characteristic line diagram showing an example of a change in an engine state, an SOC, charge acceleration information, engine start stop information and engine stop prohibition information over time.

Next, an explanation will be made of the engine start control processing to be executed by the main controller 28 with reference to FIG. 3 and FIG. 4.

First, at step 1, it is determined whether or not an SOC of the electricity storage device 19 detected by the BCU 19A is equal to or more than a first lower limit value min1.

In a case where a determination of "NO" is made at step 1, since the SOC is lower than the first lower limit value min1, the process goes to step 2. At step 2, a command for displaying charge acceleration information is outputted to the display device 30 from the main controller 28. Here, the charge acceleration information is information that starts up the engine 9 to prompt the charge of the electricity storage device 19. It should be noted that, for example, as in the case of being out of fuel or abnormality of the engine 9, in a situation where the engine 9 does not start even when the assist motor generator 10 is driven, the charge acceleration information may not be outputted.

On the other hand, in a case where a determination of "YES" is made at step 1, since the SOC is equal to or larger than the first lower limit value min1, the process goes to step 3. At step 3, it is determined whether or not the engine 9 is during start-up. "During engine start-up" is, for example, a state where the key switch 29 is operated to the start position and a rotational speed of the engine 9 is lower than a predetermined rotational speed (for example, idling rotational speed).

In a case where a determination of "NO" is made at step 3, for example, as in a state where the key switch 29 is in an off position and the engine 9 is being stopping, the engine 9 is not during start-up. Therefore, the engine start control processing ends.

On the other hand, in a case where a determination of "YES" is made at step 3, since the engine 9 is during start-up, the process goes to step 4. At step 4, the energy management control part 28B causes the lower limit value in the charge/discharge range of the electricity storage device 19 to be temporarily lower than the first lower limit value min1 in response to a command of the main controller 28 to set the SOC lower limit value to the second lower limit value min2.

At step 5, the power charged in the electricity storage device 19 is used to drive the assist motor generator 10 and start up the engine 9. In this case, since the lower limit value of the SOC is lowered from the first lower limit value min1 to the second lower limit value min2 during the engine start, it is possible to drive the assist motor generator 10 even when the SOC is equal to or less than the first lower limit value min1.

At step 6, it is determined whether or not the SOC is equal to or more than the second lower limit value min2. In a case where a determination of "NO" is made at step 6, since the SOC is lower than the second lower limit value min2, the process goes to step 7. At step 7, since the assist motor generator 10 cannot be driven due to a shortage of the SOC, an operation of the assist motor generator 10 is stopped. At step 8, a command for displaying the engine start stop information is outputted from the main controller 28 to the display device 30. Here, the engine start stop information is information that stops the start of the engine 9 and, for example, notifies a support center or the like of replacement or maintenance of the electricity storage device 19.

On the other hand, in a case where a determination of "YES" is made at step 6, since the SOC is equal to or larger than the second lower limit value min2, the process goes to step 9. At step 9, it is determined whether or not the start of the engine 9 is completed. That is, it is determined whether or not the engine rotational speed is equal to or more than a predetermined rotational speed (for example, idling rotational speed).

In a case where a determination of "NO" is made at step 9, since the start of the engine 9 is not completed, the process goes back to step 6. The process waits until the start of the engine 9 is completed.

On the other hand, in a case where a determination of "YES" is made at step 9, since the start of the engine 9 is completed, the process goes to step 10. At step 10, the energy management control part 28B causes the lower limit value in the charge/discharge range of the electricity storage device 19 to be higher than the second lower limit value min2 in response to a command of the main controller 28 to set the SOC lower limit value to the first lower limit value min1.

At subsequent step 11, it is determined whether or not the SOC is equal to or more than the first lower limit value min1. That is, the main controller 28 determines whether or not the SOC detected by the BCU 19A is sufficient to an amount of the SOC necessary for the next engine start. In a case where a determination of "YES" is made at step 11, since the SOC is equal to or more than the first lower limit value min1, it is determined that the SOC with which the engine 9 can start by the assist motor generator 10 is secured at the next engine startup to end the engine start control processing.

In a case where at step 11, a determination of "NO" is made, the SOC falls below the first lower limit value min1. In this case, since the SOC detected by the BCU 19A is lower than the first lower limit value min1 in the charge/discharge range of the electricity storage device 19, it is determined that the SOC is insufficient to the amount of the SOC necessary for the next engine start. Therefore, in a case where at step 11, a determination of "NO" is made, the process goes to step 12.

At step 12, a command for displaying the engine stop prohibition information is outputted from the main controller 28 to the display device 30. Here, the engine stop prohibition information is information that recommends the charge of the electricity storage device 19 without stopping the engine 9 until the engine stop prohibition information disappears. When step 12 ends, the process goes back to step 11, and the processes from step 11 are repeated. On the other hand, in a case where it is determined that the SOC is equal to or more than the first lower limit value min1 at step 11 in a state where the engine stop prohibition information is displayed, the engine start control processing ends, and the display of the engine stop prohibition information by the display device 30 is stopped.

It should be noted that at the time of outputting the engine stop prohibition information at step 12, a time in which the SOC for the next engine start is charged may be calculated, and the calculation result may be outputted to the display device 30. In this case, a charge time calculating method may be made, for example, in such a manner as to preliminarily prepare a map indicating a relationship between SOC increasing with the charge and charging time, calculate a difference between the present SOC and the SOC until the first lower limit value min1, and read out the corresponding charging time from the map. In addition, the charge time calculating method is made not only limited to the map, but also may be made by calculating a remaining time until the SOC reaches the first lower limit value min1 by various kinds of calculation processing, based upon a difference between the present SOC and the SOC until the first lower limit value min1.

Next, an explanation will be made of output timings of the charge acceleration information, the engine start stop information and the engine stop prohibition information with reference to a characteristic line diagram shown in FIG. 4.

First, an explanation will be made of a period I in FIG. 4. In the period I, in a case where the engine 9 is during start-up, the energy management control part 28B sets an SOC lower limit value to a second lower limit value min2. The main controller 28 performs controls of the ECU 9A, the BCU 19A, the MGCU 24A, the CCU 26A and the like, drives the assist motor generator 10 and starts up the engine 9.

When the engine 9 rotates in an idling rotational speed or more and becomes in an engine start completion state, the energy management control part 28B sets the SOC lower limit value to a first lower limit value min1. At this time, since the SOC is lower than the first lower limit value min1 immediately after the engine 9 becomes in the engine start completion state in this period I, the main controller 28 displays the engine stop prohibition information on the display device 30. As a result, until the SOC necessary for the next start of the engine 9 is charged, an operator is guided not to stop the engine 9 to certainly perform the next start of the engine 9.

Next, an explanation will be made of a period II in FIG. 4. In the period II, there is assumed a state where a preliminary engine start operation is stopped ahead of the start completion of the engine 9. Therefore, the SOC falls below the first lower limit value min1 in a stage ahead of the start of the engine 9.

Since the SOC is lower than the first lower limit value min1 in a state where the engine 9 has stopped in the period II, the main controller 28 displays the engine acceleration information on the display device 30. As a result, an operator is prompted to start the engine 9 to charge the electricity storage device 19, thus avoiding an event that the engine 9 stays in a stop state for a long time and the SOC is lowered, making it impossible to start the engine 9. When the operator switches the engine 9 to "during the engine start", the energy management control part 28B sets the SOC lower limit value to the second lower limit value min2, and the main controller 28 drives the assist motor generator 10 and starts up the engine 9.

Thereafter, in a case where the start of the engine 9 is completed, the energy management control part 28B sets the SOC lower limit value to the first lower limit value min1. At this time, since the SOC is lower than the first lower limit value mint, the main controller 28 displays the engine stop prohibition information on the display device 30. It should be noted that the charge acceleration information is displayed even during the start of the engine 9, but since a start operation of the engine 9 is already started in a case where the engine 9 is during start-up, the charge acceleration information may be not displayed.

Next, an explanation will be made of a period III in FIG. 4. In a case where the engine 9 is during start-up in the period III, the energy management control part 28B sets the SOC lower limit value to the second lower limit value min2. The main controller 28 drives the assist motor generator 10 and starts up the engine 9. In this case, when the start of the engine 9 is not completed due to some factor and the SOC becomes lower than the second lower limit value min2, the main controller 28 displays the engine start stop information on the display device 30. As a result, an operator is notified of the start of the engine 9 being impossible due to the SOC shortage and of making contact with a support center and the like.

In this way, in the first embodiment, the lower limit value in the charge/discharge range of the electricity storage device 19 is lowered from the first lower limit value min1 to the second lower limit value min2 at the time of starting up the engine 9. Therefore, even when the SOC of the electricity storage device 19 is close to the first lower limit value min1 at the time of start-up the engine 9, for example, power can be supplied from the electricity storage device 19 to the assist motor generator 10, and the assist motor generator 10 is used, making it possible to start up the engine 9. Therefore, it is possible to further enhance start performance of the engine 9 as compared to the construction machine where the lower limit value in the charge/discharge range of the electricity storage device 19 is not lowered at the engine start.

In addition, when the engine 9 starts up and when it is determined that the SOC necessary for the next engine start is insufficient, the main controller 28 displays the engine stop prohibition information on the display device 30. At this time, since an operator can recognize a state where the SOC of the electricity storage device 19 is insufficient to the next engine start by the engine stop prohibition information, an inadvertent stop of the engine 9 by the operator is suppressed, making it possible to prompt the charge of the electricity storage device 19 and secure power necessary for the next engine start in the electricity storage device 19. Since the SOC in the electricity storage device 19 necessary for the next engine start is secured at the time of starting up the engine 9, it becomes unnecessary to continue an operation of the engine 9 for charging the electricity storage device 19 at the time of stopping the engine 9. Therefore, in a case where the engine stop is necessary, the engine 9 can be stopped immediately, and an increase in fuel consumption amount or environment pollutions due to exhaust gases can be suppressed.

In addition, when the engine 9 starts up and when the SOC of the electricity storage device 19 is lower than the first lower limit value min1 in the charge/discharge range as a value necessary for the next engine start, the main controller 28 outputs the engine stop prohibition information. At this time, since an operator can recognize that the SOC of the electricity storage device 19 is lower than the first lower limit value min1 in the charge/discharge range by the engine stop prohibition information, an inadvertent stop of the engine 9 by the operator is suppressed, making it possible to secure power surpassing the first lower limit value min1 in the electricity storage device 19, as the power necessary for the next engine start.

In addition, the main controller 28 lowers the lower limit value in the charge/discharge range of the electricity storage device 19 from the first lower limit value min1 to the second lower limit value min2 at the time of starting up the engine 9, and, when the SOC is lowered than the second lower limit value min2, outputs the engine start stop information. Thereby, an operator can be quickly notified of the shortage of the SOC in the electricity storage device 19, and replacement or maintenance of the electricity storage device 19 can be prompted to shorten a period of start inability of the engine 9.

Next, FIG. 1, FIG. 2, FIG. 5 and FIG. 6 show a second embodiment of the present invention. The second embodiment is characterized in that, when a power remaining amount of an electricity storage device falls below a threshold value set lower than a lower limit value in a charge/discharge range of the electricity storage device, engine stop prohibition information is outputted. It should be noted that in the second embodiment, components identical to those in the first embodiment are referred to as identical reference numerals, and an explanation thereof is omitted.

A hybrid-type hydraulic excavator 31 according to the second embodiment, as substantially similar to the hybrid-type hydraulic excavator 1 according to the first embodiment, includes the lower traveling structure 2, the upper revolving structure 4, the working mechanism 5, the engine 9, the electricity storage device 19, a main controller 32 and the like.

The main controller 32 is configured as substantially similar to the main controller 28 according to the first embodiment, for example, is provided in the cab 7, and is connected to the ECU 9A, the BCU 19A, the MGCU 24A, the RMCU 25A, the CCU 26A and the like. The main controller 32 includes a memory part (not shown) that stores a program of the engine start control processing shown in FIG. 5, and the like. The main controller 32 executes this control program for each predetermined control cycle to control the start of the engine 9.

Next, an explanation will be made of the engine start control processing to be executed for each control cycle by the main controller 32 with reference to FIG. 5. It should be noted that, since processes of step 21 to step 31 and step 33 are respectively similar to those of step 1 to step 12 of the first embodiment, an explanation thereof will be simply made.

First, at step 21, it is determined whether or not an SOC of the electricity storage device 19 detected by the BCU 19A is equal to or more than a first lower limit value min1.

In a case where a determination of "NO" is made at step 21, since the SOC is lower than the first lower limit value min1, the process goes to step 22. At step 22, a command for displaying charge acceleration information is outputted to the display device 30 from the main controller 32.

On the other hand, in a case where a determination of "YES" is made at step 21, since the SOC is equal to or larger than the first lower limit value min1, the process goes to step 23. At step 23, it is determined whether or not the engine 9 is during start-up.

In a case where a determination of "NO" is made at step 23, since the engine 9 is not during start-up, the engine start control processing ends.

On the other hand, in a case where a determination of "YES" is made at step 23, since the engine 9 is during start-up, the process goes to step 24. At step 24, the energy management control part 28B causes the lower limit value in the charge/discharge range of the electricity storage device 19 to be temporarily lower than the first lower limit value min1 in response to a command of the main controller 32 to set the SOC lower limit value to a second lower limit value min2.

At step 25, the power charged in the electricity storage device 19 is used to drive the assist motor generator 10 and start up the engine 9.

At step 26, it is determined whether or not the SOC is equal to or more than the second lower limit value min2. In a case where a determination of "NO" is made at step 26, since the SOC is lower than the second lower limit value min2, the process goes to step 27. At step 27, since the assist motor generator 10 cannot be driven due to a shortage of the SOC, an operation of the assist motor generator 10 is stopped. At step 28, a command for displaying the engine start stop information is outputted from the main controller 32 to the display device 30.

On the other hand, in a case where a determination of "YES" is made at step 26, since the SOC is equal to or larger than the second lower limit value min2, the process goes to step 29. At step 29, it is determined whether or not the start of the engine 9 is completed.

In a case where a determination of "NO" is made at step 29, since the start of the engine 9 is not completed, the process goes back to step 26.

On the other hand, in a case where a determination of "YES" is made at step 29, since the start of the engine 9 is completed, the process goes to step 30. At step 30, the energy management control part 28B causes the lower limit value in the charge/discharge range of the electricity storage device 19 to be higher than the second lower limit value min2 in response to a command of the main controller 32 to set the SOC lower limit value to the first lower limit value min1.

At subsequent step 31, it is determined whether or not the SOC is equal to or more than the first lower limit value min1. In a case where a determination of "YES" is made at step 31, since the SOC is equal to or more than the first lower limit value min1, it is determined that the SOC with which the engine 9 can start by the assist motor generator 10 is sufficiently secured at the next engine start to end the engine start control processing.

On the other hand, in a case where at step 31, a determination of "NO" is made, since the SOC is lower than the first lower limit value min1, the process goes to step 32. At step 32, it is determined whether or not the SOC is equal to or more than a threshold value min0 lower than the first lower limit value min1.

At this time, the threshold value min0 is a value (min2<min0<min1) between the first lower limit value min1 and the second lower limit value min2 and is set to a value (min0=min1−ΔSOC) by subtracting a predetermined allowance difference ΔSOC from the first lower limit value min1. That is, at step 31 it is determined whether or not a difference between the SOC lower than the first lower limit value min1 and the first lower limit value min1 is within a range of the allowance difference ΔSOC (for example, ΔSOC is equal to or less than several percentages).

Here, the allowance difference ΔSOC is allowable to change in response to a charge time of the electricity storage device 19 and, for example, is set to such a difference in SOC that a time necessary for the SOC lower than the first lower limit value mint after the engine start to surpass the first lower limit value mint becomes within several seconds (for example, within 10 seconds). For example, in order that a time until the SOC surpasses the first lower limit value min1 after the engine start becomes within approximately five seconds, the allowance difference ΔSOC is set to a value of approximately 2%. At this time, when the first lower limit value min1 is 30% (SOC: 30%), the threshold value min0 is set to 28% (SOC: 28%).

Figure 6:
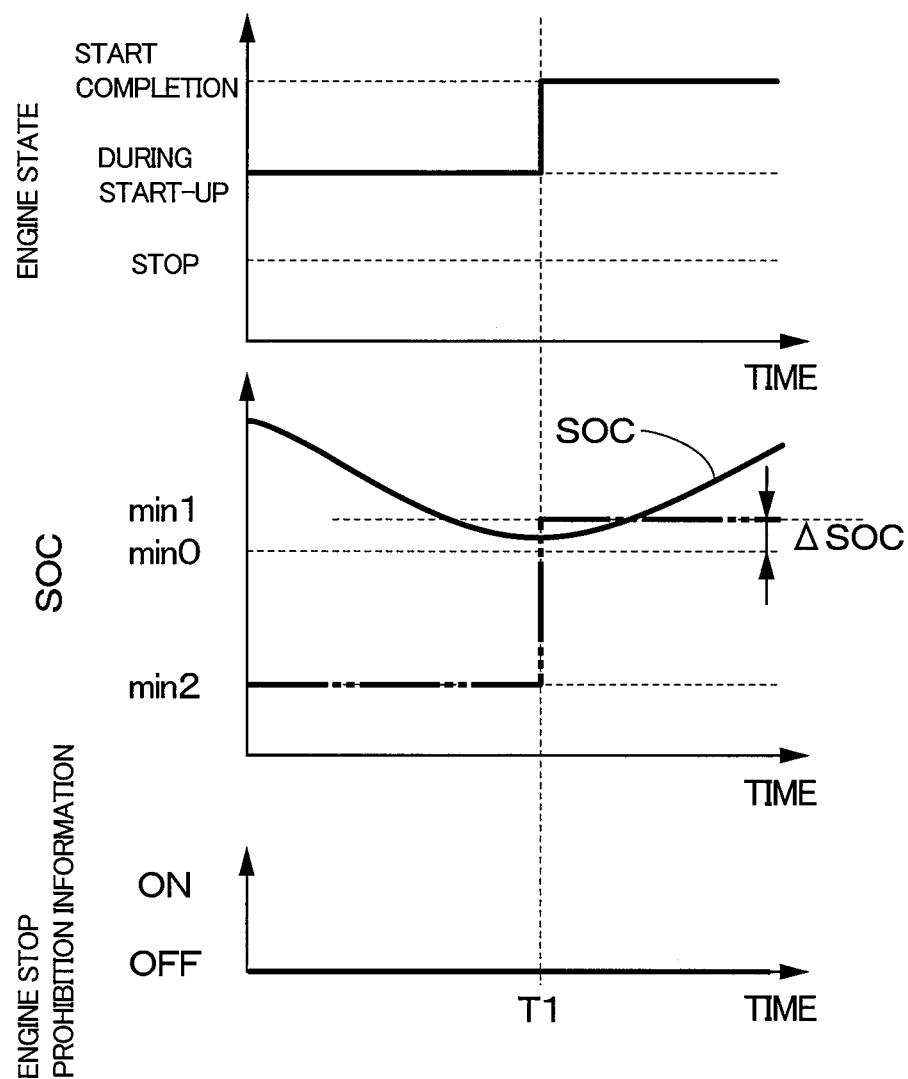
FIG. 6 is a characteristic line diagram showing an example of a change in an engine state, an SOC, and engine stop prohibition information over time in the second embodiment.

In a case where at step 32 a determination of "YES" is made, since the SOC is equal to or more than the threshold value min0, it is determined that the SOC reaches a value, in which the next engine start can be performed by the assist motor generator 10, in a short time of approximately several seconds, and the engine start control processing ends. As will be specifically explained, for example as shown in FIG. 6, since the engine state changes from a state during start-up to a state of the start completion at timing T1, the energy management control part 28B changes the SOC lower limit value from the second lower limit value min2 to the first lower limit value min1. At this time, the SOC falls below the first lower limit value min1, but does not fall below the threshold value min0. Therefore, the main controller 32 does not output the engine stop prohibition information.

On the other hand, in a case where at step 32, a determination of "NO" is made, the SOC is lower than the threshold value min0, the process goes to step 33. In this case, since the SOC detected by the BCU 19A falls below the threshold value min0 set to be lower than the first lower limit value min1 in the charge/discharge range of the electricity storage device 19, it is determined that the SOC is insufficient to the amount of the SOC necessary for the next engine start.

Therefore, at subsequent step 33, a command for displaying the engine stop prohibition information is outputted from the main controller 32 to the display device 30. When the step 33 ends, the process goes back to step 31, and the subsequent processes including step 31 are repeated. In addition, in a case where a determination of "YES" is made at step 31 and step 32 in a state where the engine stop prohibition information is displayed, the engine start control processing ends, and the display of the engine stop prohibition information by the display device 30 is stopped.

In this way, according to the second embodiment, the main controller 32, when the engine 9 starts and when the SOC of the electricity storage device 19 falls below the threshold value min0 set lower than the first lower limit value min1 in the charge/discharge range, outputs the engine stop prohibition information. At this time, since an operator can recognize that the SOC of the electricity storage device 19 falls below the threshold value min0, an inadvertent stop of the engine 9 by the operator is suppressed, making it possible to secure power surpassing the threshold value min0 in the electricity storage device 19 as the power necessary for the next engine start.

In addition, even in a case where the SOC of the electricity storage device 19 is lower than the first lower limit value min1 in the charge/discharge range, when the SOC does not fall below the threshold value min0, a shortage amount of SOC is sufficiently small, and it is possible to supplement the shortage amount of the SOC by the charge in a short time. Therefore, when the SOC does not fall below the threshold value min0, the main controller 32 does not output the engine stop prohibition information. Therefore, a notice of the engine stop prohibition information to an operator can be suppressed to the minimum.

Figure 7:
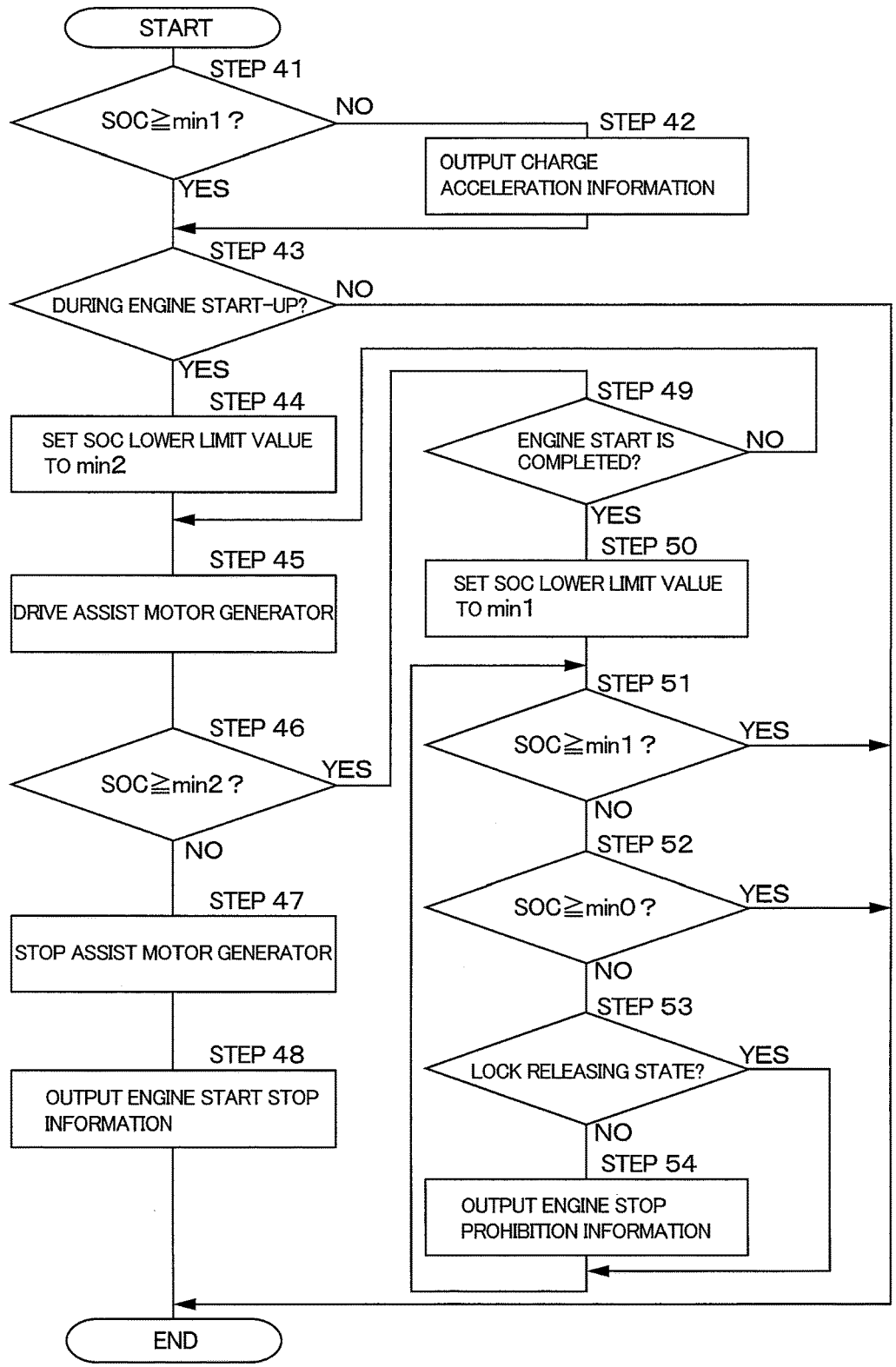
FIG. 7 is a flow chart showing an engine start control processing by a main controller in a third embodiment.

Next, FIG. 1, FIG. 2, and FIG. 7 show a third embodiment of the present invention. The third embodiment is characterized in that, when a drive command to the hydraulic actuator is effective, engine stop prohibition information is not outputted. It should be noted that in the third embodiment, components identical to those in the first embodiment are referred to as identical reference numerals, and an explanation thereof is omitted.

A hybrid-type hydraulic excavator 41 according to the third embodiment, as substantially similar to the hybrid-type hydraulic excavator 1 according to the first embodiment, includes the lower traveling structure 2, the upper revolving structure 4, the working mechanism 5, the engine 9, the electricity storage device 19, a main controller 42 and the like.

The main controller 42 is configured as substantially similar to the main controller 28 according to the first embodiment, for example, is provided in the cab 7, and is connected to the ECU 9A, the BCU 19A, the MGCU 24A, the RMCU 25A, the CCU 26A and the like. The main controller 42 includes a memory part (not shown) that stores a program of engine start control processing shown in FIG. 7, and the like. The main controller 42 executes this control program for each predetermined control cycle to control the start of the engine 9.

Next, an explanation will be made of the engine start control processing to be executed for each control cycle by the main controller 42 with reference to FIG. 7. It should be noted that, since processes of step 41 to step 52 and step 54 are respectively similar to those of step 1 to step 12 and step 32 of the first and second embodiments, an explanation thereof will be simply made.

First, at step 41, it is determined whether or not an SOC detected by the BCU 19A is equal to or more than a first lower limit value min1.

In a case where a determination of "NO" is made at step 41, since the SOC is lower than the first lower limit value min1, the process goes to step 42. At step 42, a command for displaying charge acceleration information is outputted to the display device 30 from the main controller 42.

On the other hand, in a case where a determination of "YES" is made at step 41, since the SOC is equal to or larger than the first lower limit value min1, the process goes to step 43. At step 43, it is determined whether or not the engine 9 is during start-up.

In a case where a determination of "NO" is made at step 43, since the engine 9 is not during start-up, the engine start control processing ends.

On the other hand, in a case where a determination of "YES" is made at step 43, since the engine 9 is during start-up, the process goes to step 44. At step 44, the energy management control part 28B causes the lower limit value in the charge/discharge range of the electricity storage device 19 to be temporarily lower than the first lower limit value min1 in response to a command of the main controller 42 to set the SOC lower limit value to the second lower limit value min2.

At step 45, the power charged in the electricity storage device 19 is used to drive the assist motor generator 10 and start up the engine 9.

At step 46, it is determined whether or not the SOC is equal to or more than the second lower limit value min2. In a case where a determination of "NO" is made at step 46, since the SOC is lower than the second lower limit value min2, the process goes to step 47. At step 47, since the assist motor generator 10 cannot be driven due to a shortage of the SOC, an operation of the assist motor generator 10 is stopped. At step 48, a command for displaying the engine start stop information is outputted from the main controller 42 to the display device 30.

On the other hand, in a case where a determination of "YES" is made at step 46, since the SOC is equal to or larger than the second lower limit value min2, the process goes to step 49. At step 49, it is determined whether or not the start of the engine 9 is completed.

In a case where a determination of "NO" is made at step 49, since the start of the engine 9 is not completed, the process goes back to step 46.

On the other hand, in a case where a determination of "YES" is made at step 49, since the start of the engine 9 is completed, the process goes to step 50. At step 50, the energy management control part 28B causes the lower limit value in the charge/discharge range of the electricity storage device 19 to be higher than the second lower limit value min2 in response to a command of the main controller 42 to set the SOC lower limit value to the first lower limit value min1.

At subsequent step 51, it is determined whether or not the SOC is equal to or more than the first lower limit value min1. In a case where a determination of "YES" is made at step 51, since the SOC is equal to or more than the first lower limit value min1, it is determined that the SOC with which the engine 9 can start by the assist motor generator 10 is sufficiently secured at the next engine start to end the engine start control processing.

On the other hand, in a case where at step 51, a determination of "NO" is made, since the SOC is lower than the first lower limit value min1, the process goes to step 52. At step 52, it is determined whether or not the SOC is equal to or more than a threshold value min0 lower than the first lower limit value min1.

In a case where at step 52 a determination of "YES" is made, since the SOC is equal to or more than the threshold value min0, it is determined that the SOC reaches a value, in which the next engine start can be performed by the assist motor generator 10, in a short time of approximately several seconds, and the engine start control processing ends.

In a case where at step 52 a determination of "NO" is made, since the SOC falls below the threshold value min0, the process goes to step 53.

Next, at step 53 it is determined whether or not the gate lock lever 17 is in the lock releasing state. When a determination of "YES" is made at step 53, since the gate lock lever 17 is in the lock releasing state and drive commands to the hydraulic motors 2E, 2F, 21 and the cylinders 5D to 5F are effective, the process goes back to step 51 and the subsequent processes including step 51 are repeated. At this time, the lock releasing state is made when an operator operates the gate lock lever 17 from the lock state to the lock releasing state after the start of the engine 9, which is thought as the intention of the operation start by the operator. Therefore, it is determined that the charge of the electricity storage device 19 continues to be made without an immediate stop of the engine 9, and the main controller 42 does not output the engine stop prohibition information.

On the other hand, in a case where at step 53, a determination of "NO" is made, since the gate lock lever 17 is in a lock position and in the lock state, the process goes to step 54. At step 54, a command for displaying the engine stop prohibition information is outputted from the main controller 42 to the display device 30. When the step 54 ends, the process goes back to step 51, and the subsequent processes including step 51 are repeated. In a case where a determination of "YES" is made at step 51 and step 52, the engine start control processing ends, and the display of the engine stop prohibition information by the display device 30 is stopped.

In this way, in the third embodiment, the main controller 42 does not output the engine stop prohibition information when the drive commands to the hydraulic motors 2E, 2F, 21 and the cylinders 5D to 5F are effective by the gate lock lever 17. Here, the time when the drive commands to the hydraulic motors 2E, 2F, 21 and the cylinders 5D to 5F are effective by the gate lock lever 17 is the time when an operator drives the hydraulic motors 2E, 2F, 21 and the cylinders 5D to 5F, it is thought that the charge of the electricity storage device 19 continues to be performed without the immediate stop of the engine 9. Therefore, when the drive commands to the hydraulic motors 2E, 2F, 21 and the cylinders 5D to 5F are effective by the gate lock lever 17, even when the SOC of the electric storage device 19 is insufficient to the SOC necessary for the next engine start, the main controller 42 does not output the engine stop prohibition information. As a result, the notice of the engine stop prohibition information to an operator can be suppressed to the minimum.

It should be noted that in the third embodiment, at step 52 of the engine start control processing to be executed for each control cycle by the main controller 42, it is determined whether or not the SOC is equal to or more than the threshold value min0 lower than the first lower limit value min1. However, the present invention is not limited thereto, and it may be determined whether or not the gate lock lever at step 53 is released after step 51 without step 52.

Figure 8:
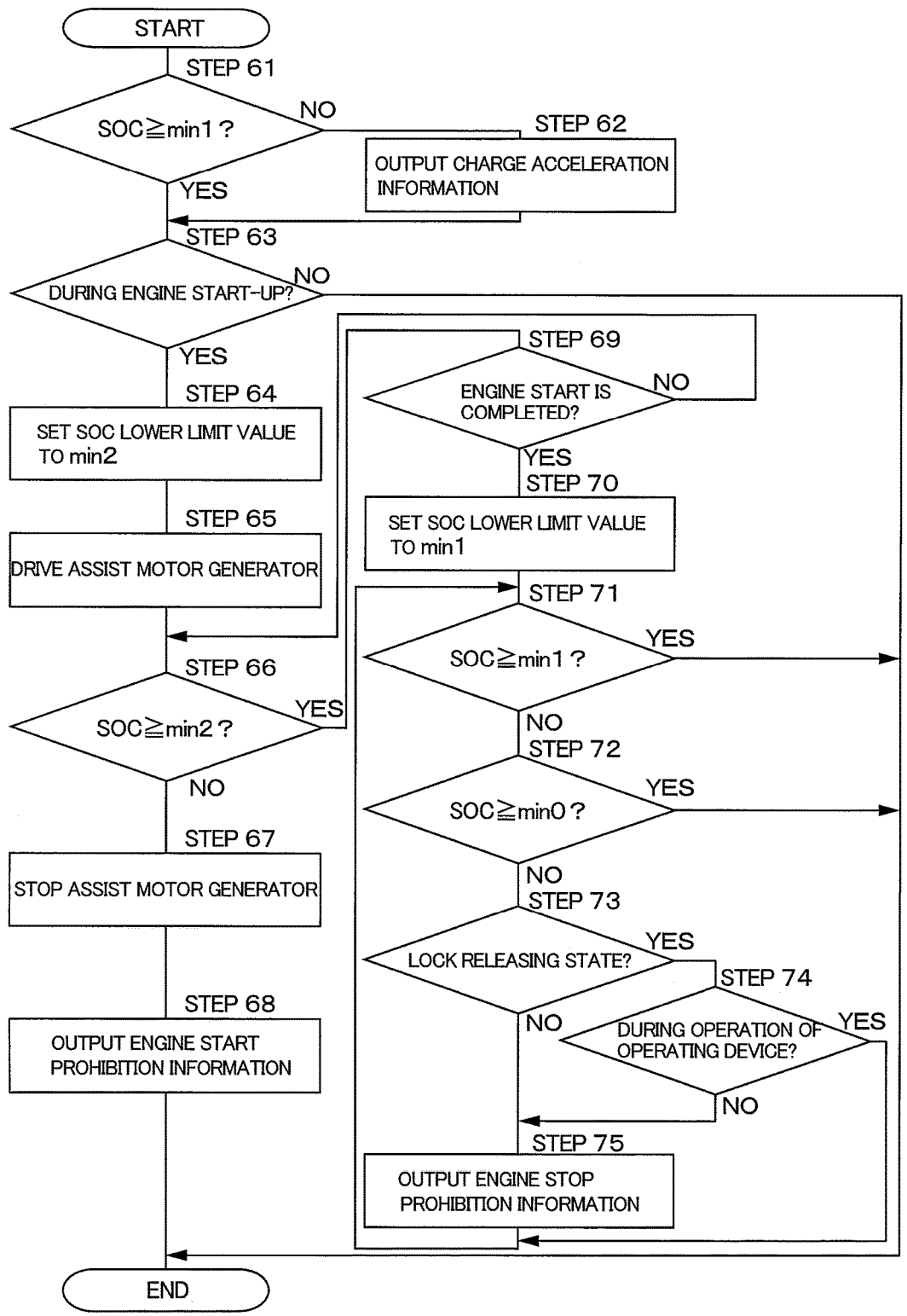
FIG. 8 is a flow chart showing an engine start control processing by a main controller in a fourth embodiment.

Next, FIG. 1, FIG. 2, and FIG. 8 show a fourth embodiment of the present invention. The fourth embodiment is characterized in that, when an operating device is being operated, engine stop prohibition information is not outputted. It should be noted that in the fourth embodiment, components identical to those in the first embodiment are referred to as identical reference numerals, and an explanation thereof is omitted.

A hybrid-type hydraulic excavator 51 according to the third embodiment, as substantially similar to the hybrid-type hydraulic excavator 1 according to the first embodiment, includes the lower traveling structure 2, the upper revolving structure 4, the working mechanism 5, the engine 9, the electricity storage device 19, a main controller 52 and the like.

The main controller 52 is configured as substantially similar to the main controller 28 according to the first embodiment, for example, is provided in the cab 7, and is connected to the ECU 9A, the BCU 19A, the MGCU 24A, the RMCU 25A, the CCU 26A and the like. The main controller 52 includes a memory part (not shown) that stores a program of engine start control processing shown in FIG. 8, and the like. The main controller 52 executes this control program for each predetermined control cycle to control the start of the engine 9.

Next, an explanation will be made of the engine start control processing to be executed for each control cycle by the main controller 52 with reference to FIG. 8. It should be noted that, since processes of step 61 to step 73 and step 75 are respectively similar to those of step 1 to step 12, step 32 and step 53 of the first, second, and third embodiments, an explanation thereof will be simply made.

First, at step 61, it is determined whether or not an SOC detected by the BCU 19A is equal to or more than a first lower limit value min1.

In a case where a determination of "NO" is made at step 61, since the SOC falls below the first lower limit value min1, the process goes to step 62. At step 62, a command for displaying charge acceleration information is outputted to the display device 30 from the main controller 52.

On the other hand, in a case where a determination of "YES" is made at step 61, since the SOC is equal to or larger than the first lower limit value min1, the process goes to step 63. At step 63, it is determined whether or not the engine 9 is during start-up.

In a case where a determination of "NO" is made at step 63, since the engine 9 is not during start-up, the engine start control processing ends.

On the other hand, in a case where a determination of "YES" is made at step 63, since the engine 9 is during start-up, the process goes to step 64. At step 64, the energy management control part 28B causes the lower limit value in the charge/discharge range of the electricity storage device 19 to be temporarily lower than the first lower limit value min1 in response to a command of the main controller 52 to set the SOC lower limit value to a second lower limit value min2.

At step 65, the power charged in the electricity storage device 19 is used to drive the assist motor generator 10 and start the engine 9.

At step 66, it is determined whether or not the SOC is equal to or more than the second lower limit value min2. In a case where a determination of "NO" is made at step 66, since the SOC falls below the second lower limit value min2, the process goes to step 67. At step 67, since the assist motor generator 10 cannot be driven due to a shortage of the SOC, an operation of the assist motor generator 10 is stopped. At step 68, a command for displaying engine start stop information is outputted from the main controller 52 to the display device 30.

On the other hand, in a case where a determination of "YES" is made at step 66, since the SOC is equal to or larger than the second lower limit value min2, the process goes to step 69. At step 69, it is determined whether or not the start of the engine 9 is completed.

In a case where a determination of "NO" is made at step 69, since the start of the engine 9 is not completed, the process goes back to step 66.

On the other hand, in a case where a determination of "YES" is made at step 69, since the start of the engine 9 is completed, the process goes to step 70. At step 70, the energy management control part 28B causes the lower limit value in the charge/discharge range of the electricity storage device 19 to be higher than the second lower limit value min2 in response to a command of the main controller 52 to set the SOC lower limit value to the first lower limit value min1.

At subsequent step 71, it is determined whether or not the SOC is equal to or more than the first lower limit value min1. In a case where a determination of "YES" is made at step 71, since the SOC is equal to or more than the first lower limit value min1, it is determined that the SOC with which the engine 9 can start by the assist motor generator 10 is sufficiently secured at the next engine start to end the engine start control processing.

On the other hand, in a case where at step 71, a determination of "NO" is made, since the SOC falls below the first lower limit value min1, the process goes to step 72. At step 72, it is determined whether or not the SOC is equal to or more than a threshold value min0 lower than the first lower limit value mint.

In a case where at step 72 a determination of "YES" is made, since the SOC is equal to or more than the threshold value min0, it is determined that the SOC reaches a value, in which the next engine start can be performed by the assist motor generator 10, in a short time of approximately several seconds, and the engine start control processing ends.

In a case where at step 72 a determination of "NO" is made, since the SOC falls below the threshold value min0, the process goes to step 73.

Next, at step 73 it is determined whether or not the gate lock lever 17 is in a lock releasing state. In a case where at step 73, a determination of "NO" is made, since the gate lock lever 17 is in a lock position and in a lock state, the process goes to step 75. At step 75, a command for displaying the engine stop prohibition information is outputted from the main controller 52 to the display device 30. In addition, the process goes back to step 71, and the subsequent processes including step 71 are repeated.

On the other hand, when a determination of "YES" is made at step 73, since the gate lock lever 17 is in the lock releasing state and drive commands to the hydraulic motors 2E, 2F, 21 and the cylinders 5D to 5F are effective, the process goes to step 74. At subsequent step 74, it is determined whether or not the operating device 14 is during operating. When a determination of "YES" is made at step 74, since the operating device 14 is during operating and the drive commands to the hydraulic motors 2E, 2F, 21 and the cylinders 5D to 5F are during being outputted, the process goes back to step 71 and the subsequent processes including step 71 are repeated. Here, when the operating device 14 is operated, since a revolving operation or an excavating work by an operator is during being performing, it is determined that the engine 9 is not stopped immediately and the charge of the electricity storage device 19 continues to be performed, so that the main controller 52 does not output the engine stop prohibition information.

On the other hand, in a case where at step 74, a determination of "NO" is made, since the operating device 14 is not operated, the process goes to step 75. At subsequent step 75, a command for displaying the engine stop prohibition information is outputted from the main controller 52 to the display device 30. The process goes back to step 71, and the subsequent processes including step 71 are repeated. In a case where a determination of "YES" is made at step 71 and step 72, the engine start control processing ends, and the display of the engine stop prohibition information by the display device 30 is stopped.

In this way, in the fourth embodiment, the main controller 52 does not output the engine stop prohibition information when the operating device 14 is operated. Here, when the operating device 14 is operated, since the hydraulic motors 2E, 2F, 21 and the cylinders 5D to 5F are during driving by an operator, it is thought that the engine 9 is not stopped immediately and the charge of the electricity storage device 19 continues to be performed. Therefore, when the operating device 14 is operated, even when the SOC of the electric storage device 19 is insufficient to the SOC necessary for the next engine start, the main controller 52 does not output the engine stop prohibition information. As a result, the notice of the engine stop prohibition information to an operator can be suppressed to the minimum.

In addition, the main controller 52 determines whether or not the gate lock lever 17 is released, and also determines whether or not the operating device 14 is during being operated. Therefore, as compared to a case where the gate lock lever 17 is in the lock releasing state, it can be more certainly determined whether or not an operator is during performing operations of the hydraulic motors 2E, 2F, 21 and the cylinders 5D to 5F to accurately determine whether or not the charge to the electricity storage device 19 continues to be performed.

It should be noted that in the fourth embodiment, at step 72 of the engine start control processing to be executed for each control cycle by the main controller 52, it is determined whether or not the SOC is equal to or more than the threshold value min0 lower than the first lower limit value min1. However, the present invention is not limited thereto, and it may be determined whether or not the gate lock lever at step 73 is released after step 71 without step 72.

Figure 5:
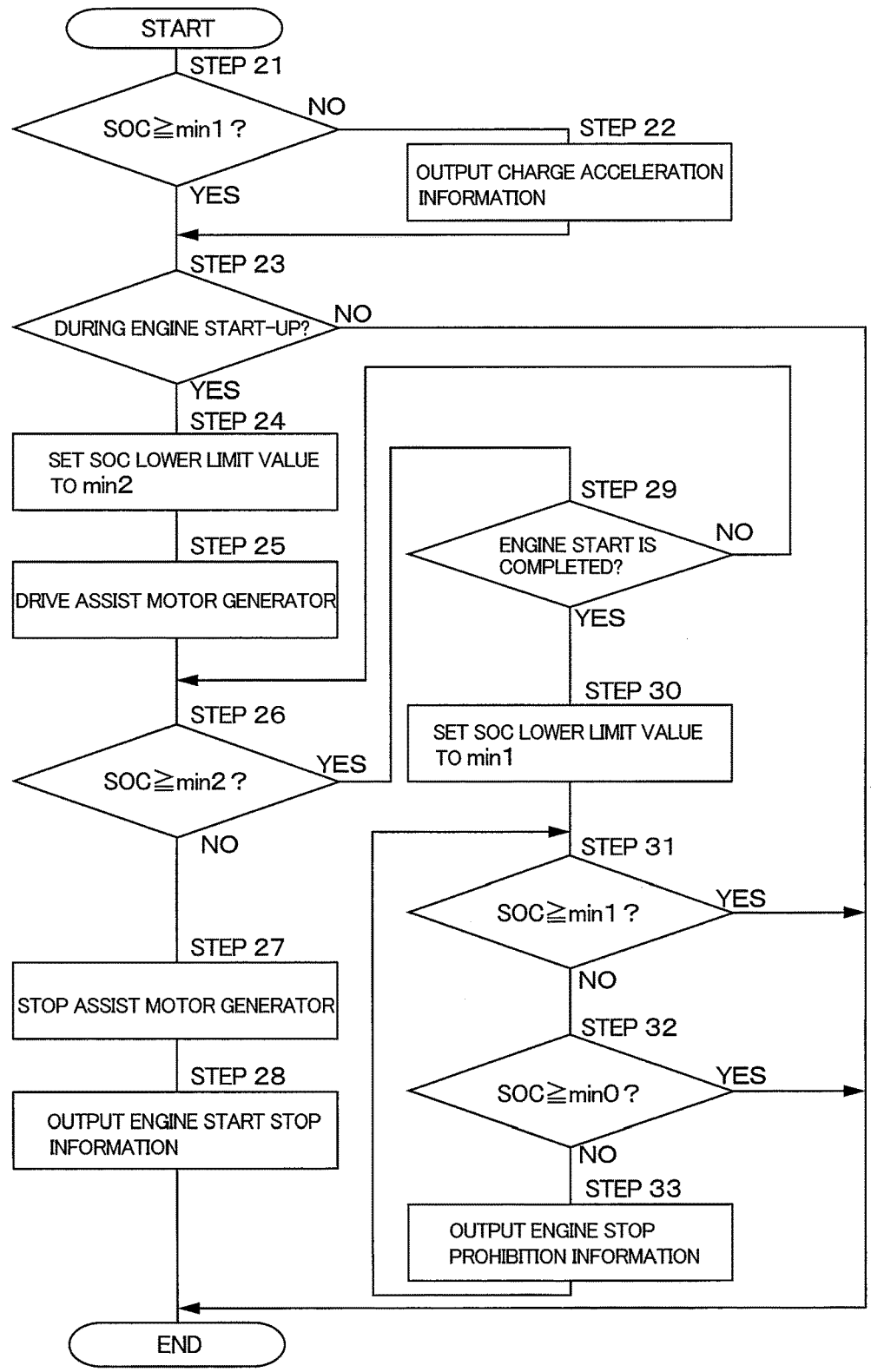
FIG. 5 is a flow chart showing an engine start control processing by a main controller in a second embodiment.

Here, in the first to fourth embodiments, steps 9 to 12 in FIG. 3, steps 29 to 33 in FIG. 5, steps 49 to 54 in FIG. 7 and steps 69 to 75 in FIG. 8 show specific examples of the information output units.

The first to fourth embodiments are explained by taking a case where the time when the start of the engine 9 is completed is defined as the time the engine 9 starts up, as an example. However, the present invention is not limited thereto, but, for example, as in the case where the determination of "YES" is made at step 3 in FIG. 3, the time when the start of the engine 9 is started may be defined as the time when the engine is started up. Therefore, when the SOC is insufficient to the value necessary for the next engine start during start-up of the engine 9, it is possible to notify an operator of the event.

In the first to fourth embodiments, the assist motor generator 10 starts up the engine 9. However, the present invention is not limited thereto, but, for example, by providing a starter motor for starting up an engine in addition to an assist motor generator, the engine may start by the starter motor and the assist motor generator. In this case, the assist motor generator assists in the start of the engine by the starter motor.

The first to fourth embodiments are explained by taking a case of adopting the hybrid-type revolving device configured of the revolving hydraulic motor 21 and the revolving electric motor 22 as the revolving device 20, as an example. However, the present invention is not limited thereto, but the revolving device may be a hydraulic type revolving device constructed of, for example, a revolving hydraulic motor alone or may be an electric motor type revolving device provided with a revolving device configured of a revolving electric motor alone (without a hydraulic motor).

In the first to fourth embodiments, the charge acceleration information, the engine start stop information and the engine stop prohibition information are displayed on the display device 30. However, the present invention is not limited thereto, but, for example, a voice or a buzzer may be used to notify an operator of each information.

It should be noted that in a case where the electricity storage device 19 is configured of a secondary cell, the electricity storage device 19 may be connected to the DC buses 27A, 27B without the chopper 26.

The first to fourth embodiments are explained by taking a case where the automotive hydraulic excavators 1, 31, 41, 51 of a crawler type each are used as the construction machine, as an example. However, the present invention is not limited thereto, but the present invention may be applied to an automotive wheel type hydraulic excavator, a mobile crane, and further, a stationary excavator or crane in which a revolving structure is mounted on a non-traveling base body to be capable of revolving thereon, and the like. In addition, the present invention may be widely applied to various types of working vehicles, working machines and the like that are not equipped with a revolving structure such as wheel loaders or fork lifts, as the construction machine.

DESCRIPTION OF REFERENCE NUMERALS 1, 31, 41, 51: Hydraulic excavator (Construction machine)
2E: Traveling hydraulic motor (Hydraulic actuator)
2F: Traveling hydraulic motor (Hydraulic actuator)
5D: Boom cylinder (Hydraulic actuator)
5E: Arm cylinder (Hydraulic actuator)
5F: Bucket cylinder (Hydraulic actuator)
9: Engine
10: Assist motor generator (Electric motor)
11: Hydraulic pump
14: Operating device
17: Gate lock lever (Lock device)
19: Electricity storage device
19A: BCU (Power remaining amount detecting unit)
21: Revolving hydraulic motor (Hydraulic actuator)
28, 32, 42, 52: Main controller (Start control device)

28B: Energy management control part (Charge/discharge range setting unit)

The invention claimed is:

1. A construction machine comprising:
    an engine;
    an electric motor connected mechanically to said engine;
    a hydraulic pump connected mechanically to said engine;
    an electricity storage device connected electrically to said electric motor;
    a battery controller that detects a power remaining amount in said electricity storage device; and
    a main controller that lowers a lower limit value of a charge/discharge range of said electricity storage device when said engine starts up using said electric motor, wherein
    said main controller includes a first lower limit value as a lower limit value in a typical charge/discharge range, and a second lower limit value which is a value smaller than said first lower limit value by a power amount by which said engine can start at least once,
    said main controller outputs charge acceleration information for notifying an operator when said power remaining amount detected by said battery controller is lower than said first lower limit value,
    said main controller determines whether or not said engine is in a start-up condition and sets said lower limit value of the charge/discharge range of said electricity storage device to said second lower limit value when it is determined that said engine is in the start-up condition,
    said main controller stops said engine and outputs engine start stop information when said power remaining amount detected by said battery controller is lower than said second lower limit value,
    said main controller determines whether or not the start of said engine is completed when said power remaining amount detected by said battery controller is higher than said second lower limit value, and sets said lower limit value of the charge/discharge range of said electricity storage device to said first lower limit value when it is determined that the start of said engine is completed, and
    said main controller outputs engine stop prohibition information when it is determined that the power remaining amount detected by said battery controller is lower than said first lower limit value and it is determined that the power remaining amount detected by said battery controller is insufficient to a power remaining amount necessary for the next engine start.

2. The construction machine according to claim 1, further comprising:
    a hydraulic actuator to be driven by pressurized oil delivered from said hydraulic pump; and
    a gate lock lever for switching effectiveness and ineffectiveness of a drive command to said hydraulic actuator, wherein
    said main controller does not output the engine stop prohibition information when the drive command is effective.

3. The construction machine according to claim 2, further comprising:
    an operating pedal/lever that outputs the drive command to said hydraulic actuator, wherein
    said main controller does not output the engine stop prohibition information when said operating pedal/lever is in operation.

* * * * *